United States Patent
Lyo et al.

(10) Patent No.: US 7,914,948 B2
(45) Date of Patent: Mar. 29, 2011

(54) METALLIC BIPOLAR PLATE FOR FUEL CELL AND METHOD FOR FORMING SURFACE LAYER OF THE SAME

(75) Inventors: In Woong Lyo, Gyeonggi-do (KR); Jeong Uk An, Seoul (KR); Seung Gyun Ahn, Gyeonggi-do (KR); Young Min Nam, Gyeonggi-do (KR); Yoo Chang Yang, Gyeonggi-do (KR); Sae Hoon Kim, Gyeonggi-do (KR); Sang Mun Chin, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/336,870

(22) Filed: Dec. 17, 2008

(65) Prior Publication Data

US 2009/0269623 A1    Oct. 29, 2009

(30) Foreign Application Priority Data

Jul. 16, 2008   (KR) .................. 10-2008-0069327

(51) Int. Cl.
  *H01M 8/00*   (2006.01)
  *H01M 8/02*   (2006.01)
  *H01M 4/66*   (2006.01)
  *H01M 4/64*   (2006.01)
  *H05H 1/24*   (2006.01)

(52) U.S. Cl. ........ 429/535; 429/512; 429/518; 429/522; 427/569; 427/115

(58) Field of Classification Search .............. 429/12–13, 429/40; 148/217–218, 284, 287, 316–318; 427/115, 126.1, 569
See application file for complete search history.

(56) References Cited

U.S. PATENT DOCUMENTS

2007/0015029 A1   1/2007   Budinski et al.

FOREIGN PATENT DOCUMENTS

| GB | 2180264 A | * | 3/1987 |
| JP | 08-045530 |   | 2/1996 |
| JP | 2002-151110 |   | 5/2002 |
| JP | 2003-331861 |   | 11/2003 |
| JP | 2005-264235 |   | 9/2005 |
| JP | 2007-012526 |   | 1/2007 |
| JP | 2007073440 A | * | 3/2007 |
| JP | 2008103136 A | * | 5/2008 |
| KR | 10-0791274 |   | 12/2007 |
| KR | 10-0836480 |   | 6/2008 |

OTHER PUBLICATIONS

Machine Translation and Abstract in English of JP 2007-073440.*
Machine Translation and Abstract in English of JP 2008-103136.*

\* cited by examiner

*Primary Examiner* — Dah-Wei D Yuan
*Assistant Examiner* — Claire L Rademaker
(74) *Attorney, Agent, or Firm* — Edwards Angell Palmer & Dodge LLP; Peter F. Corless (57) ABSTRACT

The present invention provides a metallic bipolar plate for a fuel cell and a method for forming a surface layer of the same, in which the surface layer is formed in such a manner that a plasma nitridation process is performed on the surface of a stainless steel base material to form a nitrogen implanted layer, and oxidation and reduction processes are performed on the surface of the nitrogen implanted layer to form a $Fe_3O_4$ surface oxidation layer thereon, thus improving conductivity and corrosion resistance.

9 Claims, 4 Drawing Sheets

METALLIC BIPOLAR PLATE FOR FUEL CELL AND METHOD FOR FORMING SURFACE LAYER OF THE SAME

CROSS-REFERENCE TO RELATED APPLICATION

This application claims under 35 U.S.C. §119(a) the benefit of Korean Patent Application No. 10-2008-0069327 filed Jul. 16, 2008, the entire contents of which are incorporated herein by reference.

BACKGROUND (a) Technical Field

The present invention relates to a metallic bipolar plate for a fuel cell and a method for forming a surface layer of the same. More particularly, the present invention relates to a metallic bipolar plate for a fuel cell and a method for forming a surface layer of the same, in which the surface layer is preferably formed in such a manner that a plasma nitridation process is performed on the surface of a stainless steel base material to form a nitrogen implanted layer, and oxidation and reduction processes are performed on the surface of the nitrogen implanted layer to form a $Fe_3O_4$ surface oxidation layer thereon, and thus suitably improving conductivity and corrosion resistance.

(b) Background Art

A fuel cell is an electricity generation system that does not convert chemical energy of fuel into heat by combustion, but electrochemically converts the chemical energy of fuel directly into electrical energy in a fuel cell stack. Such a fuel cell can be used in the supply of electric power for small-sized electrical/electronic devices such as portable devices, as well as in the supply of electric power for industry, home, and vehicle.

At present, the most attractive fuel cell for a vehicle is a polymer electrolyte membrane fuel cell (PEMFC) having the highest power density among the fuel cells. The polymer electrolyte membrane fuel cell has a fast start-up time and a fast reaction time for power conversion due to its low operation temperature.

The polymer electrolyte membrane fuel cell typically comprises: a membrane electrode assembly (MEA) including a polymer electrolyte membrane for transporting hydrogen ions and an electrode catalyst layer, in which an electrochemical reaction takes place, disposed on both sides of the polymer electrolyte membrane; a gas diffusion layer (GDL) for uniformly diffusing reactant gases and transmitting generated electricity; a gasket and a sealing member for maintaining airtightness of the reactant gases and coolant and providing an appropriate bonding pressure; and a bipolar plate for transferring the reactant gases and coolant.

In the fuel cell having the above-described configuration, hydrogen as a fuel and oxygen (air) as an oxidizing agent are supplied to an anode and a cathode through flow fields of the bipolar plate, respectively. The hydrogen is supplied to the anode (also called a "fuel electrode", "hydrogen electrode", and "oxidation electrode") and the oxygen (air) is supplied to the cathode (also called an "air electrode", "oxygen electrode", and "reduction electrode").

The hydrogen supplied to the anode is dissociated into hydrogen ions (protons, $H^+$) and electrons ($e^-$) by catalyst of the electrode catalyst layer provided on both sides of the electrolyte membrane. At this time, only the hydrogen ions are transmitted to the cathode through the electrolyte membrane, which is a cation exchange membrane, and at the same time the electrons are transmitted to the anode through the GDL and the bipolar plate, which are conductors.

At the cathode, the hydrogen ions supplied through the electrolyte membrane and the electrons transmitted through the bipolar plate meet the oxygen in the air supplied to the cathode by an air supplier to cause a reaction that produces water.

Due to the movement of hydrogen ions caused at this time, the flow of electrons through an external conducting wire occurs, thus generating a current.

The electrode reactions in the polymer electrolyte membrane fuel cell can be represented by the following formulas:

Reaction at the anode: $2H_2 \rightarrow 4H^+ + 4e^-$

Reaction at the cathode: $O_2 + 4H^+ + 4e^- \rightarrow 2H_2O$

Overall reaction: $2H_2 + O_2 \rightarrow 2H_2O$ + electrical energy + heat energy The above-described bipolar plate in the fuel cell is a core component together with the MEA and performs various functions such as structural support of the MEA and GDL, collection and transmission of the generated current, transport of the reactant gases, transport and removal of the reaction by-products, and transport of the coolant for removing the reaction heat. Accordingly, the bipolar plate should have characteristics such as excellent corrosion resistance, airtightness, and chemical stability.

Conventional bipolar plates are formed of a graphite material or a composite graphite material, in which resin and graphite are mixed, having excellent electrical conductivity and chemical stability. However, the graphite bipolar plate has drawbacks in that it has mechanical strength and airtightness lower than those of a metallic bipolar plate and has high manufacturing cost and low productivity since the manufacturing process is performed manually without the use of a machine due to its fragility.

Accordingly, extensive research aimed at substituting the graphite bipolar plate by the metallic bipolar plate has been conducted.

Surface treatment methods of a stainless steel bipolar plate as the metallic bipolar plate for the fuel cell are broadly classified into two methods. According to the first method, carbide or nitride is coated on the surface of the stainless steel bipolar plate by physical vapor deposition (PVD), that is, a coating layer of chromium nitride (CrN) or titanium nitride (TiN) is formed on the surface thereof. According to the second method, the surface of the stainless steel bipolar plate is modified by nitriding or carburizing. For the surface modification, extensive research aimed at improving surface characteristics by forming a nitride layer by plasma nitridation at a temperature below 600° C. has been conducted.

The CrN coating layer formed by the physical vapor deposition has excellent corrosion resistance; however, it has drawbacks in that the contact resistance is relatively high, and the cost is high. Especially, since the PVD coating of CrN, TiN, etc. can provide a coating layer of good quality, a desired performance of the fuel cell bipolar plate can be obtained; however, it requires a high vacuum process and it has limitations in terms of manufacturing cost and mass productivity.

Meanwhile, the surface modification method such as nitriding has advantages in that the manufacturing cost is low and the mass productivity is excellent; however, it deteriorates the characteristics of the base material, and thus the corrosion resistance is reduced. In case of the surface nitride layer formed by the plasma nitridation has excellent cost competitiveness; however, since the surface nitride layer forms a nitride by combining with chromium (Cr) of the base material, it consumes chromium of the base material to form a chromium depletion layer having numerous pores on the surface thereof, and thus the corrosion resistance of the surface layer is reduced. If the chromium depletion layer is formed on the stainless steel surface layer as chromium of the base material is nitrided, the surface of the steel is oxidized and corroded. Moreover, if a thin oxide is formed on the surface layer, the corrosion resistance is improved; however, the contact resistance of the surface is excessively increased, and thus the bipolar plate no longer functions.

Accordingly, in order to apply the stainless steel to the fuel cell bipolar plate, it is necessary to provide a surface structure and a surface treatment process, which can prevent the nitration of chromium and the formation of an oxidation layer in a low temperature process and improve the corrosion resistance by minimizing surface defects.

Japanese Patent Publication No. 2000-353531 discloses a technique for forming a chromium nitride such as CrN, $Cr_2N$, $CrN_2$ and $Cr(N_3)_3$ by coating chromium on the surface of a base material and performing a nitridation process. This technique requires a reduction in temperature and time of the nitridation process to improve the mass productivity and reduce the manufacturing cost. In forming the chromium nitride layer as a protective layer, if the temperature and time of the nitridation process are reduced, it is difficult to ensure a desired corrosion resistance.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for forming a metallic bipolar plate, which can replace the conventional expensive graphite bipolar plates which occupy a substantial portion of the manufacturing cost of a fuel cell stack, the metallic bipolar plate of the present invention having a surface structure which overcomes the disadvantage of a metallic material such as low corrosion resistance and achieves stable transfer of electricity.

The present invention preferably provides a surface layer of a metallic bipolar plate for a fuel cell and a method for forming the same. The surface layer of a metallic bipolar plate for a fuel cell and a method for forming the same can preferably be produced in process of mass production, which is a suitably inexpensive process, and in further embodiments the surface layer of a metallic bipolar plate for a fuel cell and a method for forming the same as described herein satisfies a desired performance of the fuel cell with a nanostructure of the surface layer.

In one aspect, the present invention provides a metallic bipolar plate for a fuel cell, the metallic bipolar plate having a surface layer structure in which a nitrogen implanted layer is formed on the surface of a stainless steel base material by a plasma nitridation process and a $Fe_3O_4$ surface oxidation layer is formed on the surface of the nitrogen implanted layer by surface oxidation and reduction processes.

In a preferred embodiment, the nitrogen implanted layer has a thickness of less than 300 nm, less than 250 nm, preferably less than 200 nm, and an uppermost surface layer having a depth of less than 75 nm, preferably less than 50 nm from the surface of the nitrogen implanted layer is formed into a highly concentrated nitrogen implanted layer in which the nitrogen concentration is at least more than 35%, 40%, 45%, 50%, 55%, 60%, preferably at least more than 50%.

In another preferred embodiment, the $Fe_3O_4$ surface oxidation layer is formed with a thickness of 30 to 150 nm, preferably 50 to 100 nm in a state where surface pores of the nitrogen implanted layer are filled with oxide, in which $Fe_3O_4$ phase is contained in the surface pores of the nitrogen implanted layer and the surface oxidation layer at least more than 70%, 75%, 80%, 85% or more, preferably 85% of the overall volume.

In another aspect, the present invention provides a method for forming a surface layer of a metallic bipolar plate for a fuel cell, the method comprising: forming a nitrogen implanted layer on the surface of a stainless steel base material by performing a plasma nitridation process for the stainless steel base material; and forming a $Fe_3O_4$ surface oxidation layer on the surface of the nitrogen implanted layer by performing surface oxidation and reduction processes for the stainless steel base material on which the nitrogen implanted layer is formed.

In a preferred embodiment, the nitrogen implanted layer is formed by performing the plasma nitridation process for the stainless steel base material at a temperature of 300 to 390° C. in a mixed gas atmosphere of hydrogen and nitrogen for 10 to 60 minutes.

In another preferred embodiment, the plasma nitridation process is performed in a mixed gas atmosphere of hydrogen and nitrogen in a volume ratio of 1:1.

In still another preferred embodiment, the surface oxidation process is performed for the stainless steel base material on which the nitrogen implanted layer is formed in an oxygen atmosphere at a temperature of 300 to 390° C. for 10 to 100 minutes.

In yet another preferred embodiment, the reduction process is performed at a temperature of 300 to 390° C. for 30 to 180 minutes, preferably immediately after the surface oxidation process.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| 10: bipolar plate base material | 11: nitrogen implanted layer |
| 12: surface oxidation layer | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the invention features aA metallic bipolar plate for a fuel cell, the metallic bipolar plate having a surface layer structure in which a nitrogen implanted layer is formed on the surface of a stainless steel base material and a $Fe_3O_4$ surface oxidation layer is formed on the surface of the nitrogen implanted layer.

In one embodiment of the invention, the nitrogen implanted layer formed on the surface of a stainless steel base material is formed by a plasma nitridation process.

In another embodiment, $Fe_3O_4$ surface oxidation layer is formed on the surface of the nitrogen implanted layer by surface oxidation and reduction processes.

In another aspect the invention features a method for forming a surface layer of a metallic bipolar plate for a fuel cell, the method comprising forming a nitrogen implanted layer on the surface of a stainless steel base material; and forming a $Fe_3O_4$ surface oxidation layer on the surface of the nitrogen implanted layer on which the nitrogen implanted layer is formed.

In one embodiment, the nitrogen implanted layer is formed by a plasma nitridation process.

In another embodiment, the $Fe_3O_4$ surface oxidation layer on the surface of the nitrogen implanted layer is formed by performing surface oxidation and reduction processes for the stainless steel base material on which the nitrogen implanted layer is formed.

In another related embodiment, the nitrogen implanted layer is formed by performing the plasma nitridation process for the stainless steel base material at a temperature of 300 to 390° C. In still another related embodiment, the nitrogen implanted layer is formed by performing the plasma nitridation process for the stainless steel base material in a mixed gas atmosphere of hydrogen and nitrogen in a volume ratio of 1:1 for 10 to 60 minutes.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention preferably provides a surface layer structure of a metallic bipolar plate of a fuel cell for a vehicle, which suitably improves corrosion resistance and suitably reduces contact resistance of various stainless steel materials (ferritic, austenitic, etc.). The invention also features a method for forming a suitable surface layer of a metallic bipolar plate, which suitably reduces the manufacturing cost of the metallic bipolar plate and suitably improves characteristics of the metallic bipolar plate.

Figure 1:
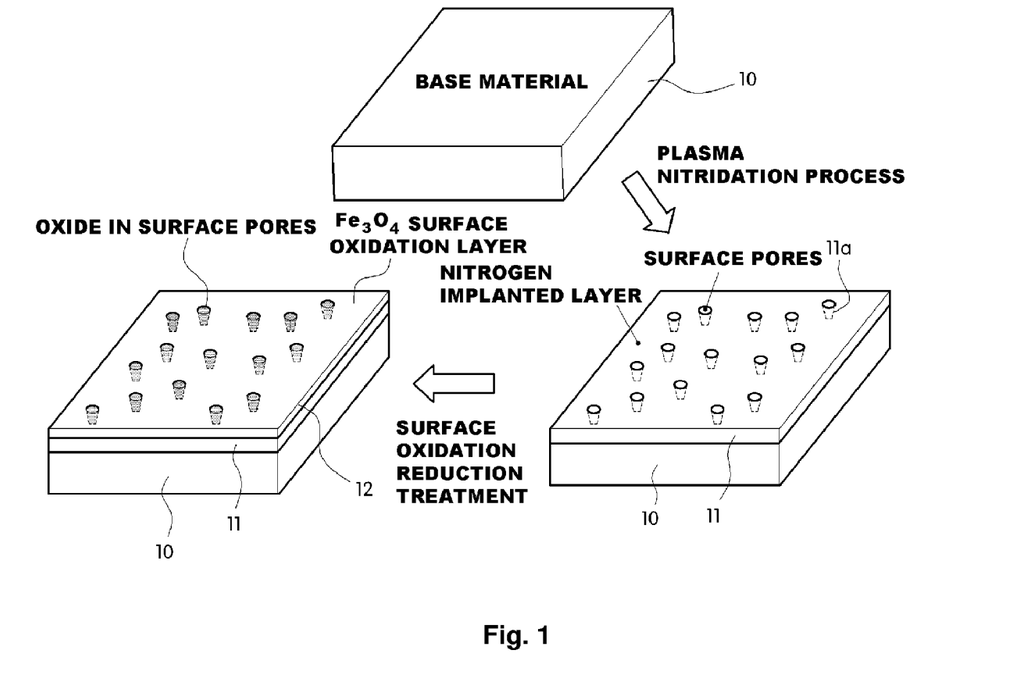
FIG. 1 is a schematic diagram showing a surface layer structure of a metallic bipolar plate and a process flow in accordance with the present invention.
Figure 2:
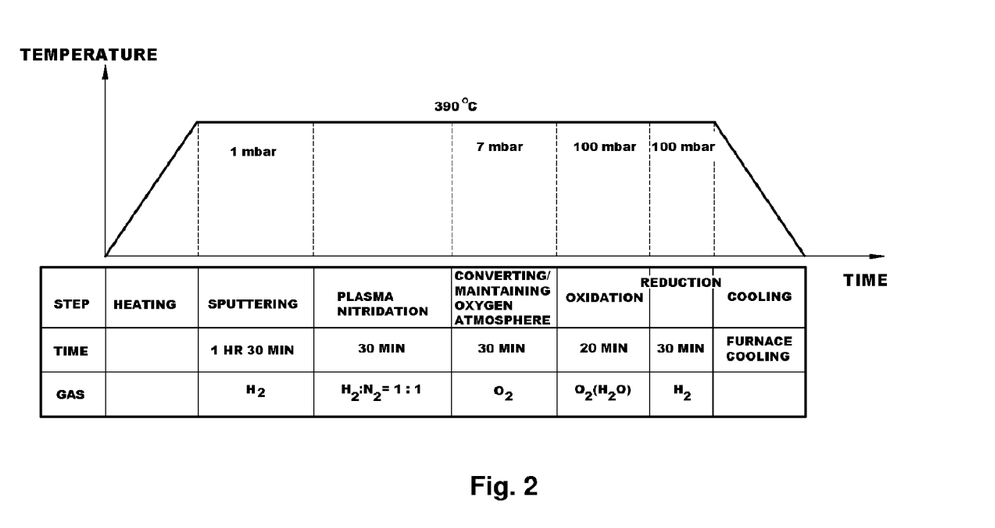
FIG. 2 is a diagram showing conditions for a process of forming a surface layer of a metallic bipolar plate in accordance with the present invention.
Figure 3:
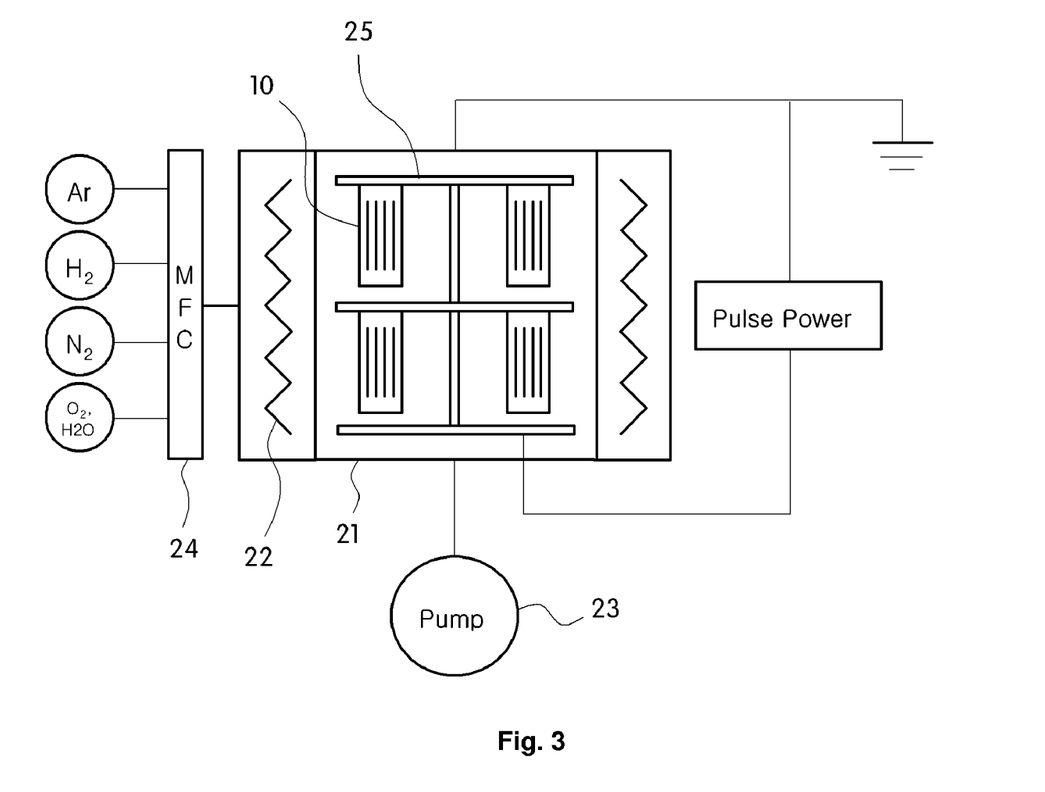
FIG. 3 is a schematic diagram showing an apparatus used to form the surface layer of the metallic bipolar plate in accordance with the present invention.

FIG. 1 is a schematic diagram showing an exemplary surface layer structure of a metallic bipolar plate and a process flow in accordance with preferred embodiments of the present invention, FIG. 2 is a diagram showing exemplary conditions for a process of forming a preferred surface layer of a metallic bipolar plate in accordance with the embodiments of the present invention, and FIG. 3 is a schematic diagram showing a preferred apparatus used to form the surface layer of the metallic bipolar plate in accordance with preferred embodiments of the present invention.

First, in certain preferred embodiments, the metallic bipolar plate for the fuel cell of the present invention preferably has a surface layer structure in which a nitrogen implanted layer 11 is suitably formed on the surface of a stainless steel base material 10 and a surface oxidation layer, preferably comprising $Fe_3O_4$, is suitably stacked on the surface of the nitrogen implanted layer 11.

In preferred embodiments of the invention as described herein, the process of forming the above-described surface layer structure on the surface of the stainless steel base material, the nitrogen implanted layer 11 is preferably formed by performing a plasma nitridation process at a suitably low temperature and the $Fe_3O_4$ surface oxidation layer 12 is suitably formed by surface oxidation and reduction processes. Accordingly, as described herein, in the case where the nitrogen implanted layer 11 is suitably formed on the surface of the base material 10 of the bipolar plate and the $Fe_3O_4$ layer 12 is suitably stacked thereon, the contact resistance and corrosion resistance are simultaneously improved.

According to other preferred embodiments of the invention as described herein, in the case where a high temperature process, for example at 400, 450, 500, 550, 600° C., preferably 500° C., such as the general plasma nitridation process is suitably applied to the formation of the nitrogen implanted layer on the surface of the stainless steel base material, chromium (Cr) of the surface layer of the base material is exhausted due to generation of Cr or Fe nitride, the structure becomes coarse, and, according to further embodiments, numerous pores are formed, thus considerably reducing the corrosion resistance, which, for example, is an important characteristic of the fuel cell bipolar plate.

Accordingly, in the present invention, a low temperature process, preferably below 400° C., is suitably applied to the plasma nitridation process of the stainless steel base material such that nitrogen is implanted to a depth of less than 400 nm, 350 nm, 300 nm, 200 nm, 150 nm or less, preferably 200 nm, through the surface of the base material. That is, according to preferred embodiments, the nitrogen implanted layer is suitably formed on the surface of the base material with a thickness of less than 200 nm.

In certain embodiments, the formation of a metal nitride such as, but not limited to, $Fe_{2-4}N$, $CrN$, etc., which suitably reduces the corrosion resistance, should be prevented, and the uppermost surface layer having a depth of less than 70 nm, 65 nm, 60 nm, 55 nm, 50 nm, 45 nm, 40 nm or less, preferably 50 nm from the surface of the nitrogen implanted layer can be suitably formed into a highly concentrated nitrogen implanted layer in which the nitrogen concentration is at least more than 35%, 40%, 45%, 50%, 55%, 60%, preferably 50%.

Referring to FIG. 1, the nitrogen implanted layer is suitably formed on the surface of the base material by performing the plasma nitridation process on the stainless steel base material for the bipolar plate.

In preferred embodiments of the invention as described herein, in order to form the nitrogen implanted layer, the stainless steel base material is suitably heated, subjected to a pretreatment process, and then subjected to the plasma nitridation process at a suitable predetermined temperature.

Preferably, the pretreatment process is performed to remove contaminants such as, but not only limited to, a chromium oxidation layer ($Cr_2O_3$) from the surface of the stainless steel base material. Since a desired nitridation is not achieved if the oxidation layer is present, in further embodiments, the oxidation layer is removed, for example by sputtering hydrogen on the surface of the base material as shown in FIG. 2. In preferred embodiments, hydrogen sputtering, in which hydrogen is supplied to the surface of the base material at a temperature of 390° C. and at a pressure of 1 mbar, may be performed for one and half hour ($H_2$ bombardment).

In other embodiments, the plasma nitridation process may be performed at a suitably low temperature, for example the same as the surface oxidation and reduction processes to be performed later, for example at a temperature of 300 to 390° C., for 10 to 60 minutes. For example, in certain preferred embodiments of the invention, in order to form the above-described nitrogen implanted layer, the plasma nitridation process may be performed in a mixed gas atmosphere of hydrogen and nitrogen in a volume ratio of 1:1 at a temperature of 390° C. and a pressure of 7 mbar for 30 minutes as shown in FIG. 2.

In certain embodiments, if the plasma nitridation process is performed for less than between 5 to 20 minutes, preferably 10 minutes, it is difficult to form a uniform surface layer, whereas, if the plasma nitridation process is performed for more than 60 minutes, an unnecessary nitride is formed and the diffusion depth is increased, thus suitably reducing the corrosion resistance.

The exemplary apparatus shown in FIG. 3 may be used to form the surface layer in accordance with further preferred embodiments of the present invention, and the following surface oxidation and reduction processes may be nearly continuously, or preferably continuously performed in the apparatus.

Preferably, in the apparatus, the bipolar plate base material 10 is suitably disposed in a stand 25 inside a chamber 21 and, after creating predetermined temperature and pressure conditions in the chamber 21 preferably using a heater 22 and a vacuum pump 23, the plasma nitridation process and the surface oxidation and reduction processes are sequentially performed by suitably supplying gases under the control of a mass flow controller (MFC) 24.

Accordingly, if the nitrogen implanted layer is formed on the surface of the stainless steel base material according to the above-described process, the formation of the chromium oxidation layer ($Cr_2O_3$) on the surface of the base material is suitably prevented, and thus the contact resistance is suitably reduced to less than 40%, 30%, 20%, 15%, 10%, preferably 20% of the general stainless steel, thus satisfying a desired performance of the fuel cell bipolar plate.

In further embodiments, after the formation of the nitrogen implanted layer, the $Fe_3O_4$ surface oxidation layer is suitably formed on the surface of the nitrogen implanted layer. The oxidation layer formation method of the present invention is suitably distinguished from a general oxidation process for improving abrasion resistance characteristics. Since the general oxidation layer has a thickness of several nanometers to several tens of nanometers, the contact resistance, which is one of the important characteristics of the fuel cell bipolar plate, is remarkably increased.

Accordingly, in preferred embodiments of the present invention, the $Fe_3O_4$ surface oxidation layer 12 is suitably formed on the uppermost surface layer with a thickness of 50 to 100 nm in a state where surface defects such as pores 11a formed on the nitrogen implanted layer 11 are filled with oxide. If the $Fe_3O_4$ surface oxidation layer 12 suitably has a thickness of less than 50 nm, it is difficult to obtain a uniform surface layer, and in certain embodiments it may have a bad effect on the corrosion resistance, whereas, if it has a thickness exceeding 100 nm, the contact resistance is suitably increased.

In other embodiments, the $Fe_3O_4$ phase is contained in the surface defects such as the pores 11a of the nitrogen implanted layer 11 and the surface oxidation layer 12 at least more than 85% of the overall volume.

In further embodiments, in the case of the oxides such as $Fe_2O$, $FeO$, $Cr_2O_3$, etc. as the surface oxidation layer, they are not applicable as the material for the fuel cell bipolar plate due to high resistance. On the contrary, in the case where the $Fe_3O_4$ oxide is formed as the surface oxidation layer, it is possible to obtain an electrical conductivity substantially the same as the conventional composite bipolar plates.

As the process of forming the $Fe_3O_4$ surface oxidation layer as the uppermost surface layer of the stainless steel base material, there is a well-known method, in which the $Fe_3O_4$ layer is directly formed at a high temperature above 550° C. for a short time of less than 10 minutes. In certain cases, such a method has an advantage in that the formation is performed by a simple process; however, it may have a bad effect on the nitrogen implanted layer, formed at low temperature, according to process variables such as time, temperature, etc., thus increasing the contact resistance or reducing the corrosion resistance.

Accordingly, the present invention preferably employs a method in which $Fe_2O_3$ phase is formed at a temperature of less than 400° C., which is similar to the nitridation temperature, and preferably heat-treated in a hydrogen atmosphere at the same temperature, thus reducing $Fe_3O_4$. In certain preferred embodiments, in the present invention, the plasma nitridation, the surface oxidation, and the reduction processes may be performed at the same temperature (for example, preferably, 300 to 390° C.), and thus it is possible to perform the low temperature process over all processes. As a result, in exemplary embodiments, it is possible to minimize the effect according to the change in the process temperature and manufacture a metallic bipolar plate having desired characteristics.

In preferred embodiments, in order to form the $Fe_3O_4$ surface oxidation layer on the surface of the base material in accordance with the present invention, after the plasma nitridation process for the base material 10 is competed in the chamber 21 of the apparatus shown in FIG. 3, preferably the surface oxidation and reduction processes are nearly continuously or continuously performed at the same temperature as the nitridation process. Preferably, prior to the surface oxidation process, a process in which an oxygen atmosphere is kept for a predetermined time after supplying oxygen to the inside of the chamber 21 as an intermediate process for converting the gas atmosphere in the chamber 21 into the oxygen atmosphere is performed.

The process of keeping the oxygen atmosphere is a stabilization process for creating a stable oxygen atmosphere prior to the oxidation process and may be preferably performed for 30 minutes as shown in FIG. 2.

When the plasma nitridation process and the atmosphere stabilization process in the chamber are completed, a heat treatment process is suitably performed to form the $Fe_3O_4$ layer as the uppermost surface layer of the bipolar plate, in which the surface oxidation process is performed to form a $Fe_2O_3$ layer on the nitridation layer and then the reduction process is nearly continuously, or preferably continuously performed in a hydrogen atmosphere, thus forming the $Fe_3O_4$ layer.

The following tables 1 and 2 show exemplary conditions of the surface oxidation process and the reduction process in accordance with preferred embodiments of the present invention.

TABLE 1

Oxidation process

| Item | Condition |
| --- | --- |
| Temperature | 300 to 390° C. |
| Pressure | 100 mbar |
| Time | 10 to 100 minutes |
| Gas | $O_2$ (or $H_2O$) |

TABLE 2

Reduction process

| Item | Condition |
| --- | --- |
| Temperature | 300 to 390° C. |
| Pressure | 100 mbar |
| Time | 30 to 180 minutes |
| Gas | $H_2$, 30 l/h |
| Cooling | Furnace cooling |

As shown in Table 1, the surface oxidation may be preferably performed at a temperature of 300 to 390° C. in an oxygen atmosphere for 10 to 100 minutes. For example, as shown in FIG. 2, the surface oxidation process may be performed at a temperature of 390° C. and at a pressure of 100 mbar for 20 minutes. In exemplary embodiments, water ($H_2O$) may be used instead of oxygen ($O_2$) for the surface oxidation according to the apparatus.

In further embodiments of the invention, and as shown in Table 2, the reduction process for forming the final $Fe_3O_4$ phase may be preferably performed at a temperature of 300 to 390° C. in a hydrogen atmosphere for 30 to 180 minutes. For example, as shown in FIG. 2, the reduction process may be performed at a temperature of 390° C. and a pressure of 100 mbar for 30 minutes (supplying hydrogen at a rate of 30 l/h). After completion of the reduction process, the resulting layer is cooled (furnace-cooled) to obtain a final surface layer.

In the case where the surface oxidation and reduction processes are preferably performed at a temperature of less than 300° C., it is difficult to form a uniform oxidation layer, whereas, if they are performed at a temperature exceeding 390° C., the thickness of the oxidation layer is considerably increased and an unnecessary nitride is formed on the nitridation layer previously formed, thus reducing the corrosion resistance. Accordingly, it is preferable that the surface oxidation and reduction processes be performed in the temperature range of 300 to 390° C.

As a result, as shown in FIG. 1, the nitrogen implanted layer is formed on the surface of the base material by the plasma nitridation process, and the surface pores of the nitrogen implanted layer are filled with oxide during the surface oxidation and reduction processes, and thus the $Fe_3O_4$ layer is formed as the uppermost surface layer.

The thus formed stainless steel metallic bipolar plate of the present invention has the surface layer structure, which can improve the corrosion resistance and reduce the contact resistance, in which the nitrogen implanted layer for reducing the contact resistance in the surface layer to the level of the graphite bipolar plate is provided. Preferably, the metallic bipolar plate of the present invention has the highly concentrated nitrogen implanted layer with a thickness of less than 200 nm without variation in components of the base material, and the $Fe_3O_4$ surface oxidation layer formed on the surface of the nitrogen implanted layer and having a thickness of 50 to 100 nm complements the surface defects of the nitrogen implanted layer, thus improving the corrosion resistance and, at the same time, satisfying a desired contact resistance of the fuel cell bipolar plate.

Meanwhile, the present inventor performed an experiment for measuring the corrosion rate and the contact resistance of the stainless steel metallic bipolar plate for the fuel cell, which will be described below.

Figure 4:
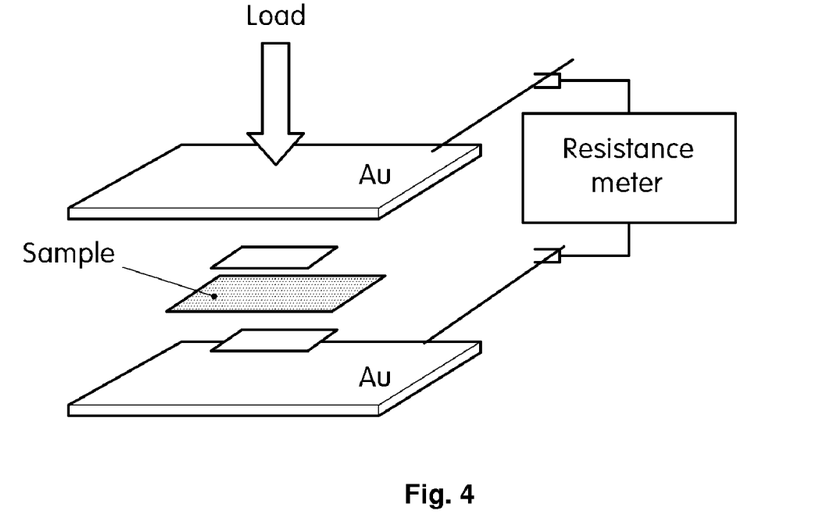
FIG. 4 is a schematic diagram showing an apparatus used to measure surface contact resistance of a bipolar plate sample.

The contact resistance experiment was performed to measure the contact resistance of the surface of the bipolar plate using an apparatus shown in FIG. 4, in which the electrical conductivity was measured. In preferred embodiments, carbon paper for increasing the adhesion was preferably placed on the top and bottom of the bipolar plate (sample), in certain embodiments having an area of 25 cm$^2$, that was suitably prepared in accordance with the present invention, a gold (Au) plate was adhered closely to the carbon paper, suitable pressure and current were applied thereto, and then the voltage and contact resistance were measured. In other preferred embodiments, the contact resistance is a criterion for determining the initial characteristics of the fuel cell, and the specific contact resistance was suitably calculated by measuring a voltage drop between the bipolar plate and the carbon paper under a load of 150 psi in order to confirm the desired performance.

The corrosion resistance is a criterion for suitably determining the long-term durability characteristics of the fuel cell and, in order to confirm the desired performance, a linear sweep voltammetry experiment was performed using a three-electrode cell, and the current density values at 0.6 V, which is the output voltage of the fuel cell, were compared based on standard electrode potentials. The used electrolyte was 0.1 N sulfuric acid and 2 ppm hydrofluoric acid solution (0.1 N $H_2SO_4$+2 ppm HF).

Based on the requirements of the U.S. Department of Energy (DOE), if the contact resistance is less than about 25 mΩcm$^2$ and the corrosion current density is less than 1 μA/cm$^2$, it can be used as the bipolar plate, which means a desired performance corresponding to a durability test for 5,000 hours.

Figure 5:
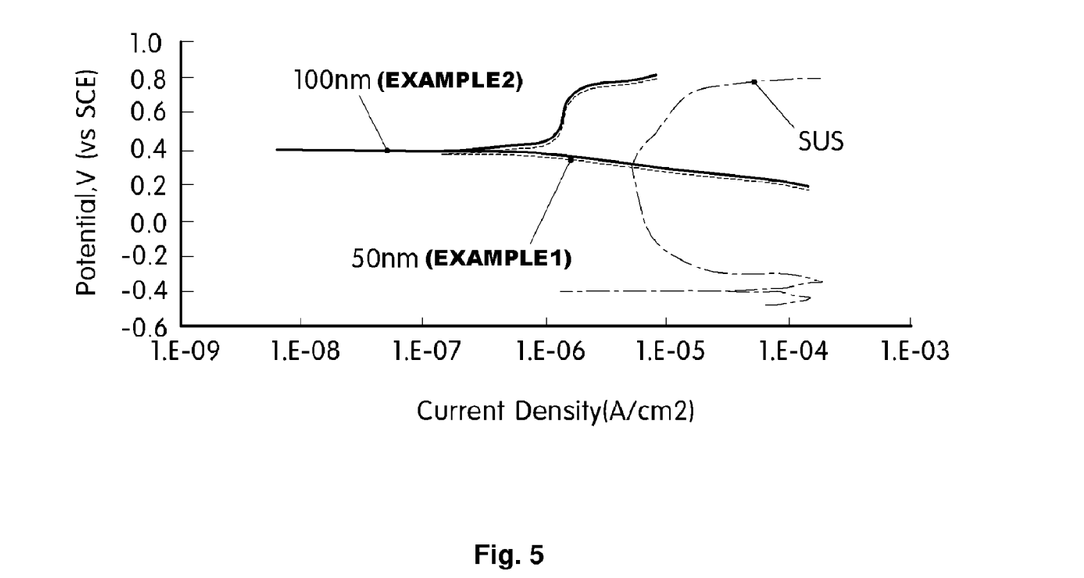
FIGS. 5 and 6 are diagram showing polarization curves of samples in accordance with examples of the present invention and comparative examples.

FIG. 5 is a diagram showing polarization curves of samples with the surface oxidation layer having a thickness of 50 nm and 100 nm, respectively, and the following table 3 shows the measurement results of the current density and the contact resistance in comparison with those of the stainless steel base material sample (SUS).

The samples with the surface layer having a thickness of 50 nm and 100 nm, respectively, were prepared in accordance with Example 1 and Example 2 of the present invention, in which the conditions for forming the surface oxidation layer were the same as shown in FIG. 2.

TABLE 3

| Classification | SUS | Example 1 (50 nm) | Example 2 (100 nm) |
|---|---|---|---|
| Current density (uA/cm$^2$ @0.6 V$_{SCE}$) | 10.2 | 1.2 | 0.98 |
| Contact resistance (mΩ cm$^2$ @150 psi) | 80 | 18.7 | 21.2 |

Figure 6:
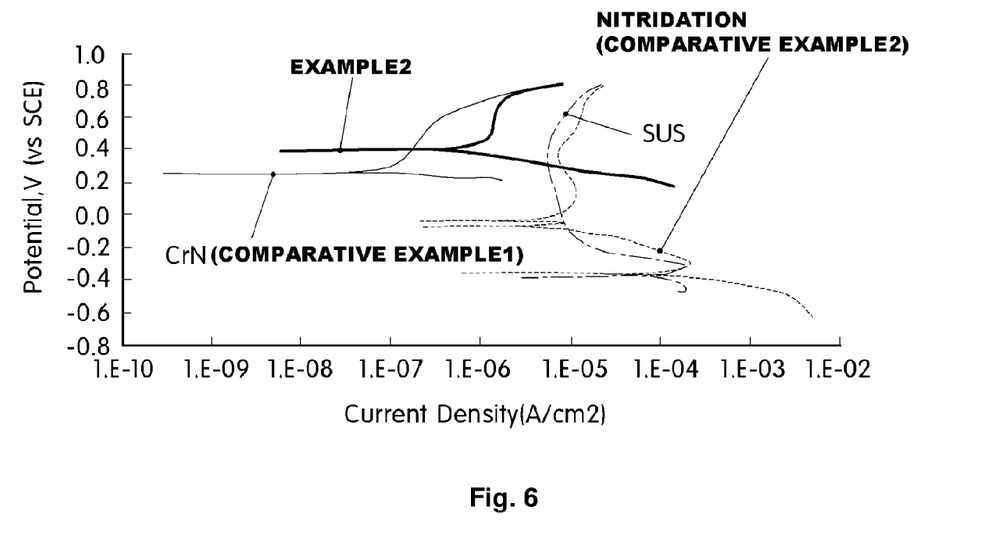

Moreover, FIG. 6 is a diagram showing polarization curves of a sample in which a CrN coating layer was suitably formed on a base material in accordance with Comparative Example 1, a sample in which only a plasma nitridation layer is formed on a base material in accordance with Comparative Example 2, and the sample prepared in accordance with Example 2 of the present invention. The following table 4 shows the measurement results of the current density and the contact resistance thereof.

TABLE 4

| Classification | SUS | Comparative Example 1 | Comparative Example 2 | Example 2 (100 nm) |
|---|---|---|---|---|
| Current density (uA/cm$^2$ @0.6 V$_{SCE}$) | 10.2 | 0.38 | 12.2 | 0.98 |
| Contact resistance (mΩ cm$^2$ @150 psi) | 80 | 10.2 | 13.6 | 21.2 |

As a result of the measurement, the contact resistance was about 20 mΩ cm$^2$ and the corrosion current density was about 1 μA/cm$^2$, which suitably satisfies the DOE requirements. In the example of the stainless steel base material, the contact resistance was about 80 mΩ cm$^2$ and the corrosion current density was about 10 μA/cm$^2$, from which it can be seen that the present invention achieves considerable improvement in the performance.

As described above, the surface layer of the metallic bipolar plate in accordance with preferred embodiments of the present invention preferably has a highly concentrated nitrogen implanted layer with a thickness of less than 400 nm, 350 nm, 300 nm, 250 nm, 200 nm, preferably 200 nm, without suitable variation in components of the base material, and the Fe$_3$O$_4$ surface oxidation layer formed on the surface of the nitrogen implanted layer and having a thickness of 25 to 150 nm, preferably 50 to 100 nm, preferably complements the surface defects of the nitrogen implanted layer, thus improving the corrosion resistance and, in further embodiments, at the same time, satisfying a contact resistance of the fuel cell bipolar plate.

Moreover, according to the method for forming the surface layer of the metallic bipolar plate of the present invention as described herein, it is possible to perform the low temperature process and suitably achieve mass production, and thus it is possible to reduce the manufacturing cost compared with the conventional graphite bipolar plate and the coated stainless steel bipolar plate.

In further preferred embodiments, the surface layer in accordance with the present invention can be formed on a thin layer (for example, preferably 0.1 mm, 0.15 mm, 0.2 mm, 0.25 mm, preferably 0.1 mm) and, in further related embodiments when applied to the stainless steel metallic bipolar plate, it is possible to considerably reduce the thickness. For example, when compared with the conventional graphite bipolar plate, the thickness of the surface layer in accordance with the present invention that can be formed on a thin layer and applied to the metallic bipolar plate is reduced. Accordingly, it is possible to increase the number of unit cells in the fuel cell stack, thus increasing the output of the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for forming a surface layer of a metallic bipolar plate for a fuel cell, the method comprising:
   forming a nitrogen implanted layer on the surface of a stainless steel base material by performing a plasma nitridation process for the stainless steel base material; and
   forming a Fe$_3$O$_4$ surface oxidation layer at a temperature of from 300° C. up to less than 400° C. on the surface of the nitrogen implanted layer by performing surface oxidation and reduction processes for the stainless steel base material on which the nitrogen implanted layer is formed.

2. The method of claim 1, wherein the nitrogen implanted layer is formed by performing the plasma nitridation process for the stainless steel base material at a temperature of 300 to 390° C. in a mixed gas atmosphere of hydrogen and nitrogen in a volume ratio of 1:1 for 10 to 60 minutes.

3. The method of claim 1, wherein the surface oxidation process is performed for the stainless steel base material on which the nitrogen implanted layer is formed in an oxygen atmosphere at a temperature of 300 to 390° C. for 10 to 100 minutes.

4. The method of claim 1, wherein the reduction process is performed at a temperature of 300 to 390° C. for 30 to 180 minutes immediately after the surface oxidation process.

5. A method for forming a surface layer of a metallic bipolar plate for a fuel cell, the method comprising:
   forming a nitrogen implanted layer on the surface of a stainless steel base material; and
   forming a Fe$_3$O$_4$ surface oxidation layer at a temperature of from 300° C. up to less than 400° C. on the surface of the nitrogen implanted.

6. The method of claim 5, wherein the nitrogen implanted layer is formed by a plasma nitridation process.

7. The method of claim 5, wherein the Fe$_3$O$_4$ surface oxidation layer on the surface of the nitrogen implanted layer is formed by performing surface oxidation and reduction processes for the stainless steel base material on which the nitrogen implanted layer is formed.

8. The method of claim 6, wherein the nitrogen implanted layer is formed by performing the plasma nitridation process for the stainless steel base material at a temperature of 300 to 390° C.

9. The method of claim 6, wherein the nitrogen implanted layer is formed by performing the plasma nitridation process for the stainless steel base material in a mixed gas atmosphere of hydrogen and nitrogen in a volume ratio of 1:1 for 10 to 60 minutes.

* * * * *